US009172552B2

(12) United States Patent
Marwah et al.

(10) Patent No.: US 9,172,552 B2
(45) Date of Patent: Oct. 27, 2015

(54) MANAGING AN ENTITY USING A STATE MACHINE ABSTRACT

(71) Applicant: Hewlett-Packard Development Company, L.P., Houston, TX (US)

(72) Inventors: Manish Marwah, Palo Alto, CA (US); Gowtham Bellala, Mountain View, CA (US); Amip J Shah, Santa Clara, CA (US); Cullen E Bash, Los Gatos, CA (US); Martin Arlitt, Alberta (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 193 days.

(21) Appl. No.: 13/755,768

(22) Filed: Jan. 31, 2013

(65) Prior Publication Data

US 2014/0215053 A1    Jul. 31, 2014

(51) Int. Cl.
*G06F 13/00*    (2006.01)
*H04L 12/28*    (2006.01)

(52) U.S. Cl.
CPC ..................... *H04L 12/28* (2013.01)

(58) Field of Classification Search
CPC ............ G06F 11/3409; G06F 11/3466; H04L 41/5009; H04L 43/08; H04L 12/28
USPC ................................................ 709/224, 223
See application file for complete search history.

(56) References Cited

U.S. PATENT DOCUMENTS

| 8,943,186 | B2* | 1/2015 | Devarakonda et al. ........ 709/223 |
| 2002/0198995 | A1* | 12/2002 | Liu et al. ........................ 709/226 |
| 2006/0025931 | A1* | 2/2006 | Rosen et al. ..................... 702/19 |
| 2006/0112061 | A1* | 5/2006 | Masurkar ......................... 706/47 |
| 2008/0092122 | A1* | 4/2008 | Caprihan et al. .............. 717/127 |
| 2012/0137345 | A1 | 5/2012 | Sheymov |
| 2012/0278488 | A1* | 11/2012 | Devarakonda et al. ........ 709/226 |
| 2012/0310370 | A1 | 12/2012 | Huang et al. |

FOREIGN PATENT DOCUMENTS

| KR | 20120067815 | 6/2012 |
| WO | WO-2012142278 | 10/2012 |

OTHER PUBLICATIONS

Gowtham Bellala, et al. "A Finite State Machine-based Characterization of Building Entities for Monitoring and Contol", Nov. 6, 2012, 8 pages, Buildsys, Toronto, ON, Canada.

Varun Chandola et al., "Anamaly Detection: A Survey", Sep. 2009, pp. 1-72, ACM Computing Surveys.

Srinivas Katipamula, et al., "Methods for Fault Detection, Diagnostics, and Prognostics for Building Systems—A Review, Part I", Jan. 2005, vol. 11, No. 1, HVAC&R Research.

(Continued)

*Primary Examiner* — Kenneth R Coulter
(74) *Attorney, Agent, or Firm* — Mannava & Kang, P.C.

(57) ABSTRACT

In an implementation, a method for managing an entity may include establishing of a framework for characterization of the entity, in which the framework abstracts operation of the entity to a state machine. In addition, each state in the state machine may be characterized in terms of distributions of a performance metric associated with the entity. The method may also include implementing of the framework for characterization of the entity to manage the entity.

15 Claims, 5 Drawing Sheets

(56) References Cited

OTHER PUBLICATIONS

Srinivas Katipamula, et al., "Methods for Fault Detection, Diagnostics, and Prognostics for Building Systems—A Review, Part II", Apr. 2005, vol. 11, No. 2, HVAC&R Research.

Oliver Parson et al., "Non-Intrusive Load Monitoring Using Prior Models of General Appliance Types", 2012 Proceed. of the Twenty-Sixth AAAI Conference.

Debprakash Patnaik et al., "Temporal Data Mining Approaches for Sustainable Chiller Management in Data Centers", Jul. 2011, vol. 2, No. 4, ACM.

Jefferey Schein et al., "A Hierarchical Rule-Based Fault Detection and Diagnostic Method for HVAC Systems", Jan. 2006, vol. 12, No. 1, HVAC&R Research.

B.W. Silverman, "Density Estimation for Statistics and Data Analysis", 1986, Published in Monographs on Statistics and Applied Probability, London: Chapman and Hall.

"Energy Efficiency Trends in Residential and Commercial Buildings" Aug. 2010, U.S. Dept of Energy.

Guymon, D. et al., Power-Efficient Cyber-Physical Late Arrival Detection with Smartphones, (Research Paper), Oct. 19-22, 2011, pp. 242-251.

* cited by examiner

MANAGING AN ENTITY USING A STATE MACHINE ABSTRACT

BACKGROUND

Successful business operations typically require efficient management of numerous physical assets (buildings, equipment, and appliances). These physical assets consume a multitude of resources such as electricity, gas, and water. Increasingly, these physical assets are being transformed into "cyber physical systems" (CPS) via addition of smart meters, sensors, and networked monitoring devices. This has resulted in a deluge of data about asset behavior and performance becoming available, however, requisite tools to analyze and leverage these data for improving asset performance are currently unavailable.

One approach to improve asset performance is to monitor the assets over time, to pro-actively identify those requiring maintenance, to detect inefficient operation, or to detect those assets that are being improperly controlled. Timely detection of inefficient performance of physical assets has been identified as being able to save around 15 to 30% of energy in commercial buildings. However, there are a number of various factors that can impact the performance of physical assets in a building. As such, it is often challenging to detect if the performance of the physical assets is efficient or not, especially if the functionalities of the physical assets have not deteriorated in a way that current monitoring techniques are able to identify.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the variables "p" and "q" are intended to denote integers equal to or greater than one and may denote different values with respect to each other.

Disclosed herein are methods and apparatuses for managing an entity, in which a framework for characterization of the entity may be established, in which the framework abstracts operation of the entity to a state machine. In addition, each state in the state machine may be characterized in terms of distributions of a plurality of performance metrics associated with the entity. In other words, the methods and apparatuses disclosed herein may establish a framework for characterization of the entity based on a finite state machine abstraction of the entity. In one regard, because the dynamics of operation of most entities, for instance, devices in commercial buildings, are relatively complex, abstracting their operation in a finite state machine as disclosed herein may allow for their modes of operation to be understood in terms of discrete states and transitions. The states of the finite state machine may be, in essence, a partition of the feature sub-space that impacts the entity's operation.

In any regard, each state in the state machine may be characterized in terms of distributions of performance metrics (e.g., sustainability metrics), such as a measure of resource consumption (e.g., power, water, gas, etc.), efficiency of operation (e.g., coefficient of performance (COP)), failure rate, environmental impact (e.g., carbon footprint, toxicity, etc.), or any other measure of interest including, for instance, maintenance cost, any usage patterns the entity exhibits (e.g., daily usage cycle), etc. According to an example, each of the states of the entity in the finite state machine abstraction may be determined by external factors that influence the performance metrics of the entity.

The methods and apparatuses disclosed herein may also include implementation of the established framework to manage the entity. By way of example, the characteristic of the entity may include any of anomaly detection, assessment, prediction, usage patterns, etc. According to an example, the resulting characteristics of the performance metrics may be determined in the form of probability distributions, which may be used to compare the current performance of the entity with its past performance. This comparison may be used to determine a performance characteristic of the entity, for instance, whether the entity is performing efficiently, inefficiently, and/or within a predetermined range of efficiency.

In one regard, therefore, the framework for characterization of the entity and/or the state machine abstraction established through implementation of the methods and apparatuses disclosed herein may be implemented to determine whether an entity is performing inefficiently, even in instances where the entity does not show outward signs of performing inefficiently.

Figure 1:
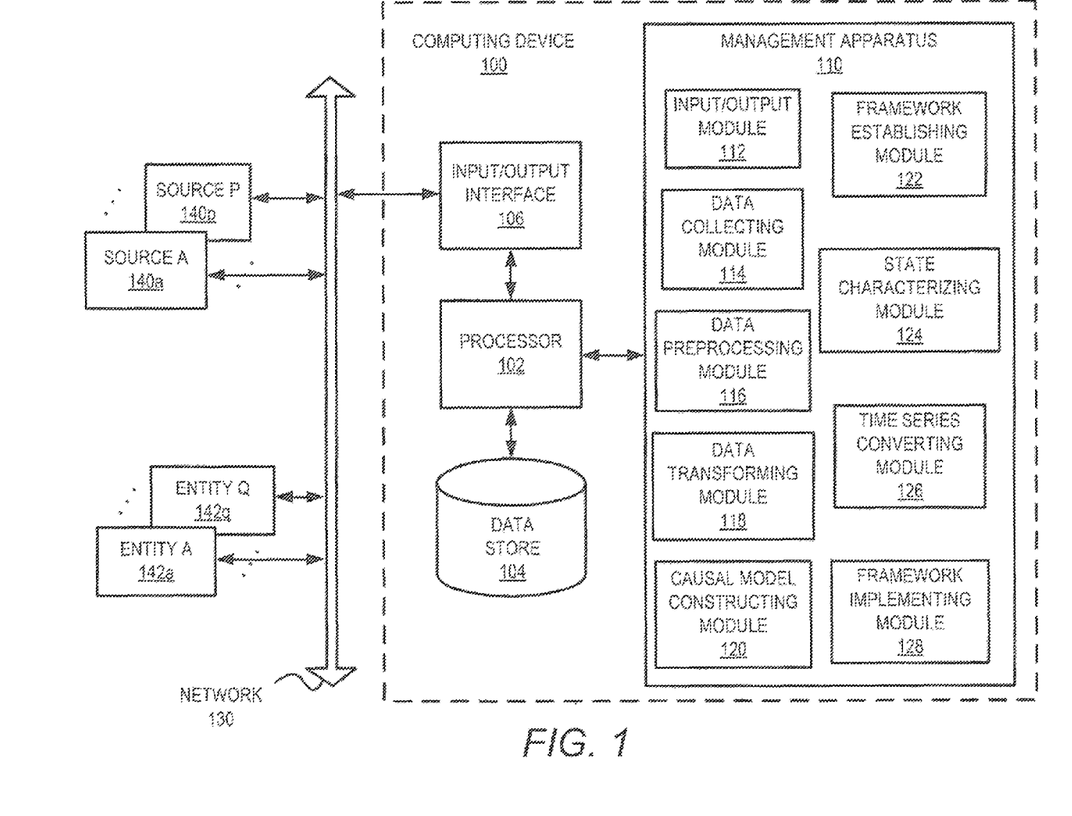
FIG. 1 shows a block diagram of a computing device for managing an area, according to an example of the present disclosure.

With reference first to FIG. 1, there is shown a block diagram of a computing device 100 for managing an entity, according to an example. It should be understood that the computing device 100 may include additional components and that some of the components described herein may be removed and/or modified without departing from the scope of the computing device 100.

As shown, the computing device 100 may include a processor 102, a data store 104, an input/output interface 106, and a management apparatus 110. The computing device 100 may be any of, for instance, a server, a computer, a laptop computer, a tablet computer, a personal digital assistant, a cellular telephone, or other electronic apparatus that may perform a method for managing an entity. The entity may be a device or appliance that consumes a resource (e.g., energy, electricity, water, gas, etc.). According to an example, the entity may be a device in a building that consumes a resource, such as an air conditioning unit, components of an air conditioning unit (e.g., chiller, condenser, etc.), lighting, etc. In addition, or alternatively, the entity may be a virtual entity, which is composed of an aggregate of devices and/or appliances that may be related to each other, such as all of the lights on a particular floor, all of the loads connected to a sub-panel, assets allocated to a single division within a company, etc.

The management apparatus 110 may establish or generate a framework for characterization of an entity, in which the framework abstracts operation of the entity to a state machine. In addition, each state in the state machine may be characterized in terms of distributions of a performance metric associated with the entity. The performance metric may include, for instance, a measure of resource consumption (e.g., energy, electricity, water, gas, etc.), a measure of an efficiency of operation (e.g., coefficient of performance (COP)), a failure rate, an environmental impact (e.g., carbon footprint, toxicity, etc.), or any other measure of interest including, for instance, maintenance cost, any usage patterns the entity exhibits (e.g., daily usage cycle), etc.

The management apparatus 110 may also implement the established framework and/or state machine abstraction to manage the entity. For instance, the management apparatus 110 may implement the established framework to control the entity. As another example, the management apparatus 110 may implement the established framework to detect anomalies in and/or assess performance of the entity. As a further example, the management apparatus 110 may predict a future state of the entity through implementation of the established framework. As a yet further example, the management apparatus 110 may determine usage patterns of the entity through implementation of the established framework. Various examples of the management of the entity through implementation of the framework are described in greater detail herein below.

The management apparatus 110 may include an input/output module 112, a data collecting module 114, a data preprocessing module 116, a data transforming module 118, a causal model constructing module 120, a framework establishing module 122, a state characterizing module 124, a time series converting module 126, and a framework implementing module 128. The processor 102, which may be a microprocessor, a micro-controller, an application specific integrated circuit (ASIC), or the like, may perform various processing functions in the computing device 100. One of the processing functions may include invoking or implementing the modules 112-128 contained in the management apparatus 110 as discussed in greater detail herein below.

According to an example, the management apparatus 110 may include machine readable instructions stored, for instance, in a volatile or non-volatile memory, such as DRAM, EEPROM, MRAM, flash memory, floppy disk, a CD-ROM, a DVD-ROM, or other optical or magnetic media, and the like. In this example, the modules 112-128 may be modules of machine readable instructions stored in the memory, which may be executable by the processor 102. According to another example, the management apparatus 110 may include a hardware device, such as a circuit or multiple circuits arranged on a board. In this example, the modules 112-128 may be circuit components or individual circuits, which the processor 102 may control. According to a further example, the management apparatus 110 may include a combination of modules with machine readable instructions and hardware modules.

The input/output interface 106 may include a hardware and/or a software interface that may be connected to an internal bus and/or to a network 130, over which the management apparatus 110 may receive and communicate information. The network 130 may generally represent a wired and/or wireless structure in an infrastructure, for instance, a cyber physical system, such as a building, equipment, etc. As also shown in FIG. 1, and according to an example, a plurality of sources 140a-140p and a plurality of entities 142a-142q may also be connected to the network 130. As discussed in greater detail below, the processor 102 may communicate with and collect data related to an entity from the sources 140a-140p through the input/output interface 106. The processor 102 may also store the collected data in the data store 104. The processor 102 may use the collected data, as well as other data stored in the data store 104 in implementing the modules 112-128 as discussed below. The data store 104 may include volatile and/or non-volatile memory, such as DRAM, EEPROM, MRAM, phase change RAM (PCRAM), Memristor, flash memory, and the like. In some examples, the processor 102 may also collect data from the entities 142a-142q and may also control the entities 142a-142q.

The sources 140a-140p may include various types of sources that may provide information that may affect performance of the entities 142a-142q. Examples of various types of sources may include, for instance, sources that collect and store data regarding entities in an infrastructure, such as a building management system (BMS) or other types of databases and/or computing devices. The sources 140a-140p may also include other types of sources, such as sources that provide weather or other types of data. The sources 140a-140p may also include sensors and/or databases that collected sensed data from the sensors.

Figure 2:
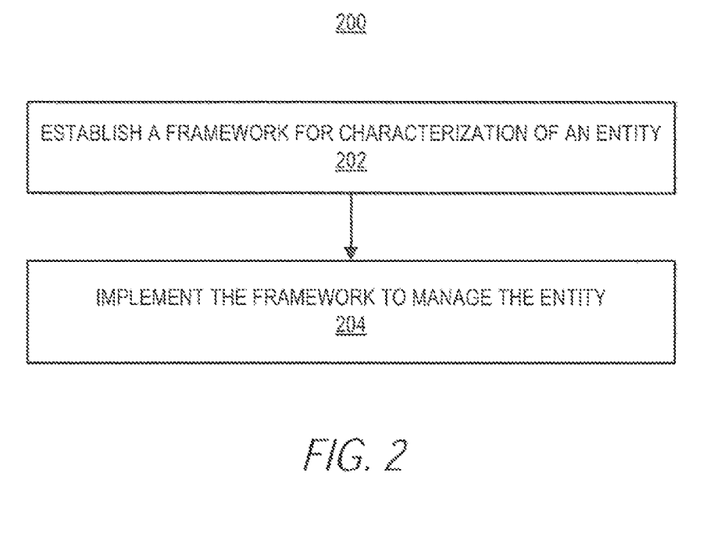
FIG. 2 illustrates a flow diagram of a method for managing an entity, according to an example of the present disclosure.
Figure 3A:
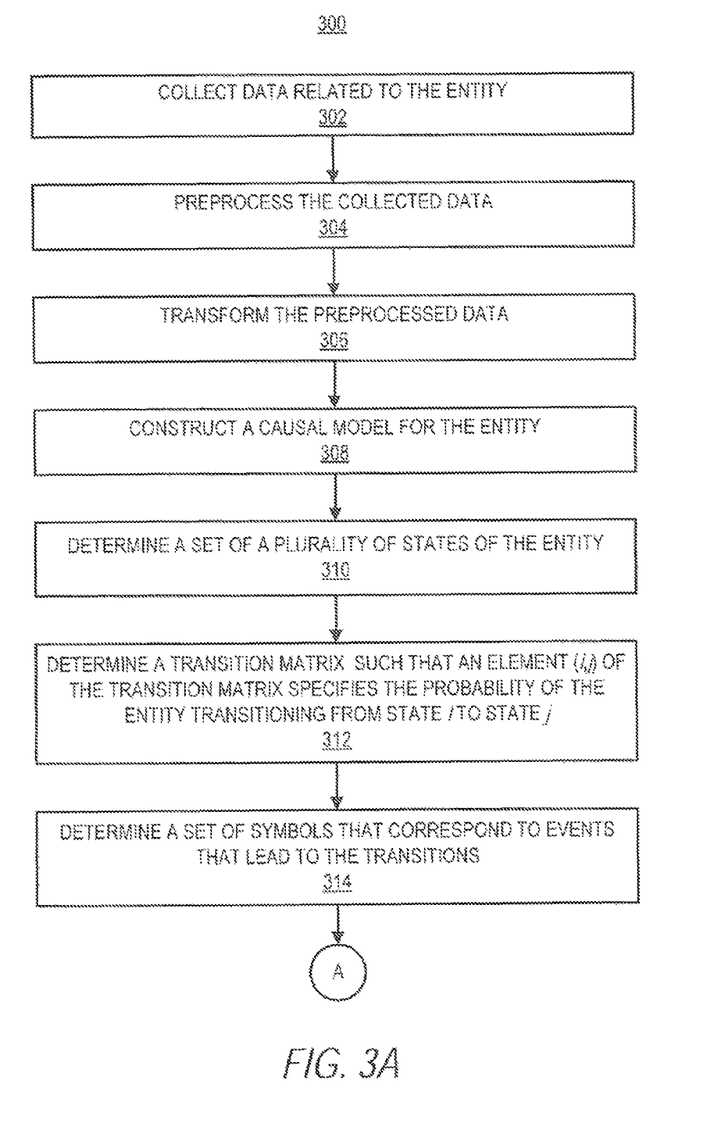
FIGS. 3A and 3B, collectively, depict a flow diagram of a method of managing an entity, according to an example of the present disclosure.
Figure 3B:
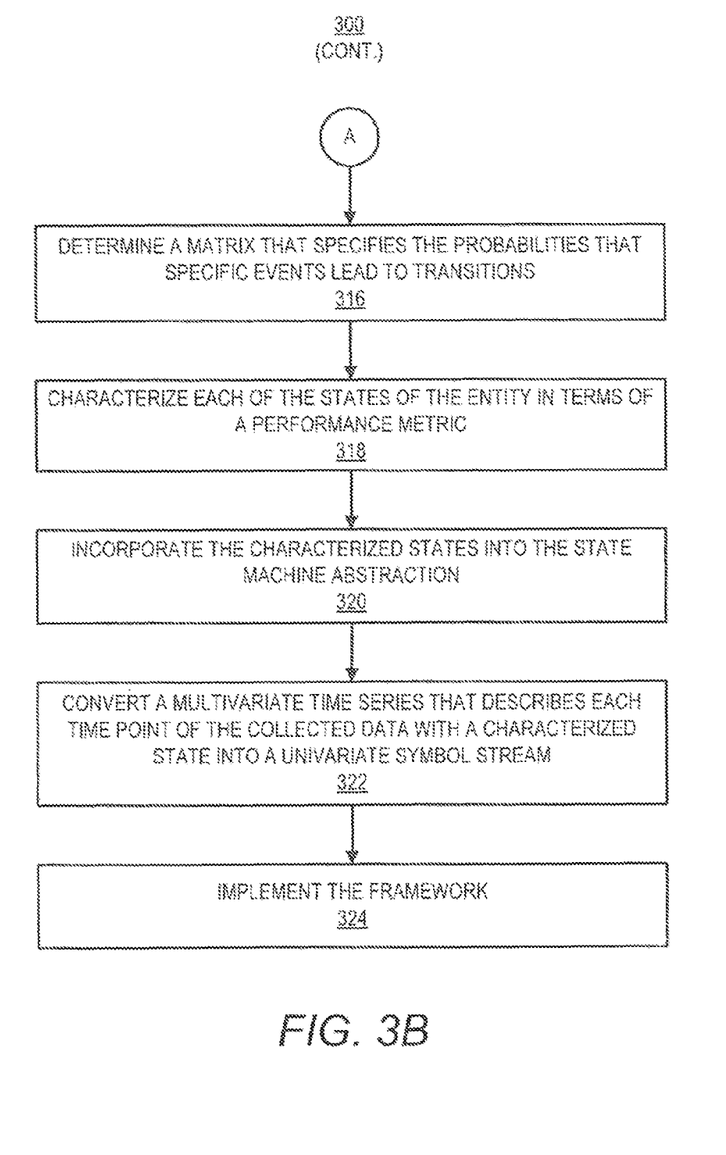

Various manners in which the modules 112-128 of the management apparatus 110 may be implemented are discussed with respect to the methods 200 and 300 respectively depicted in FIGS. 2, 3A, and 3B. It should be readily apparent that the methods 200 and 300 may represent generalized illustrations and that other operations may be added or existing operations may be removed, modified or rearranged without departing from scopes of the methods 200 and 300. According to an example, the methods 200 and/or 300 may respectively be implemented to manage multiple entities 142a-142q.

With reference first to FIG. 2, there is shown a flow diagram of a method 200 for managing an entity, according to an example. At block 202, a framework for characterization of the entity may be established, for instance, by the framework establishing module 122. The framework for characterization of the entity may be established, or equivalently generated, such that the framework abstracts operation of the entity to a state machine, in which each state in the state machine is characterized in terms of distributions of a performance metric associated with the entity. Various manners in which the framework for characterization of the entity may be established are described in greater detail herein below with respect to the method 300.

At block 204, the framework for characterization of the entity may be implemented to manage the entity 142a, for instance, by the framework implementing module 128. Various manners in which the framework for characterization of the entity may be implemented to manage the entity 142a are described in greater detail herein below with respect to the method 300.

Turning now to FIGS. 3A and 3B, there are collectively shown a method 300 for managing an entity 142a, according to an example. At block 302, data related to the entity 142a may be collected from a source 140a, for instance, by the data collecting module 114. In addition or alternatively, data related to the entity 142a or to a plurality of entities 142a-142q may be collected from a plurality of sources 140a-140p. By way of particular example in which the entity 142a is a water-cooled chiller, the collected data may include data pertaining to, for instance, flow rate, temperature, pressure, power, and other parameters associated with the chiller.

According to an example, in instances in which the data pertaining to the entity 142a is stored with data that may not pertain to the entity 142a, the pertinent data may be identified through manual and/or automated identification of the pertinent data.

At block 304, the collected data may be preprocessed, for instance, by the data preprocessing module 116. The collected data may be preprocessed through a data fusion operation, a data cleaning operation, etc. The data fusion operation may include, for instance, merging (or joining) data from multiple sources 140a-140p. The data from multiple sources 140a-140p may be fused because the multiple sources 140a-140p may have different timestamps, may collect data at different frequencies, may have different levels of data quality, etc. The data cleaning operation may include, for instance, removing data outliers, invalid values, imputing missing values, etc. The collected data may be preprocessed through implementation of any suitable preprocessing techniques.

At block 306, the preprocessed data may be transformed, for instance, by the data transforming module 118. The preprocessed data may be transformed through feature selection, dimensionality reduction, etc. The feature selection of the preprocessed data may include an identification of the features that affect the operating behavior of the entity 142a. In addition, the feature selection of the preprocessed data may include selection of a subset of the most relevant features from a set of all of the features. The subset of the most relevant features may be selected based upon a correlation or other determined relationships between features and performance metrics of the entity 142a. For this purpose, any of a number of known automated feature selection methods may be used, for example, using subset selection, using a metric such as correlation, mutual information, using statistical tests such as chi-squared test, using wrapper-based methods, etc. In addition to the automated feature selection methods listed above, a domain expert may also select, discard, or transform features or variables.

The dimensionality reduction of the preprocessed data may include mapping of all of the features or a subset of all of the features from a higher dimensional space to a lower dimensional space. The dimensionality reduction may be implemented through use of, for instance, principal component analysis (PCA), multi-dimensional scaling (MDS), Laplacian Eigenmaps, etc. Thus, according to an example, the transforming of the preprocessed data may result in a relatively smaller number of variables that relate to the entity 142a. Particularly, those variables that may not impact the entity 142a may be discarded. As another example, variables that impact the entity 142a, but may be redundant with other variables may be discarded through the dimensionality reduction.

At block 308, a causal model for the entity 142a may be constructed, for instance, by the causal model constructing module 120. The causal model may include a machine learning model that is, for instance, constructed to relate a resource use and/or a sustainability metric to the utilization, performance, and the environmental (external) conditions of the entity. According to an example, the causal model may be constructed to explain variations in a resource usage of the entity 142a.

Blocks 310-316 pertain to the abstraction of the operation of the entity to the state machine, and each of the blocks 310-316 may define a tuple in a 4-tuple in a finite state machine. Generally speaking, a data-driven approach may be implemented to abstract the operation of the entity 142a to the state machine. In other words, the state machine may be constructed based upon the data collected at block 302.

According to an example, the framework establishing module 122 may implement the operations in each of blocks 310-316.

At block 310, a set of a plurality of states (n) of the entity 142a may be determined. According to an example, different data points from the collected data may be grouped together into a plurality of states. In one regard, the plurality of states may share some properties, for instance, the states may be similar in their sustainability metric. Thus, for instance, the input space and inputs of the feature space may be digitized. In other words, the feature space may be partitioned into the states. Moreover, different state machine abstractions for the same entity 142a may be generated for different purposes.

Generally speaking, the states of the entity 142a may include the operating states of the entity 142a. In a simple example, in which the entity 142a is a lightbulb, there may be two states, the on state and the off state. In other examples, the states of the entity 142a may represent operating conditions of the entity 142a, such as sustainability levels, operating levels, efficiency levels, etc. In one regard, a type of control volume may be drawn around the entity 142a to determine the factors that impact the particular control volume and the states may be described in terms of those factors. That is, for instance, the state of the entity 142a may be determined based upon the variables that affect the operation of the entity 142a. In some instances, all of the available states of the entity 142a may not be known and thus may be determined during the characterization of the entity 142a. Moreover, once the states of the entity 142a have been determined, transitions from one state to another may be seen from the collected data.

By way of particular example in which the entity 142a is a water cooled chiller, variables relating to the chiller may include return water temperature, supply water temperature, flow rate, etc. As discussed above, a transformation, such as a PCA transformation may be performed on these variables and a clustering may be performed to put these variables together. In one regard, because these data points are being clustered based upon the input conditions (i.e., variables relating to the chiller), states that are similar in all of these different variables may be determined.

At block 312, a n×n transition matrix may be determined such that an element (i,j) of the transition matrix specifies the probability of the entity 142a transitioning from a state i to a state j may be determined. The transition matrix may include each of the states (n) determined at block 310 and may be determined by mapping the collected data onto states and counting. In addition, the transition matrix may identify the changes from state i to state j. An indication that a transition from state i to state j has not been seen is denoted by the element (i,j) equaling zero. According to an example, from the collected data, the probability that the entity 142a transitions from state i to state j may be computed and the transition matrix determined at block 312 may list the probability of transitioning from one state to another. For instance, the probability of transitioning from one state to another may be determined based upon the number of times the entity has transitioned from one state to another. That is, the probability of transitioning from one state to another may be higher if there have been a larger number of transitions from the state to the other state.

At block 314, a set of m symbols that correspond to events that lead to the transitions from state i to state j may be determined. According to an example, a set of events occurring at a particular point in the collected data may be identified to determine the events that lead to the state transitions. The events related to the entity 142a may be logged by the entity 142a itself, manually by an operator, etc. In addition, a symbol m may be assigned for each of the events.

At block 316, a n×n×m matrix that specifies events that lead to transitions such that an element (i,j,k) of the n×n×m matrix specifies the probability that event (k) causes a transition from state i to state j may be determined. In other words, the events may be correlated with the state changes in the n×n matrix to form the n×n×m matrix. The element (i,j,k) may be 1 if event k causes a transition from state i to state j, and 0 otherwise. Alternatively, instead of the hard assignment of 0 and 1, the element (i,j,k) may instead contain the probability value that event k causes a transition from state i to state j. As such, there may be a probability value for each of the events k associated with each state transition. However, most of the probability values may likely be zero or very low because most events are not likely to lead to the transitions.

At block 318, each of the states of the entity 142a may be characterized in terms of a performance metric (e.g., sustainability metric), for instance, by the state characterizing module 124. Once the state machine is created for an entity 142a, each state may be characterized in terms of a performance metric. The performance metric may be a measure of resource consumption (e.g., energy, electricity, water, gas, etc.), a measure of environmental impact (e.g., carbon footprint, toxicity, etc.), or any other quantifiable measure of interest, including a monetary cost. In other words, at block 318, a determination may be made as to the different values of the performance metric that are seen for data points that belong to that particular state At block 320, the characterized states may be incorporated into the state machine abstraction, for instance, by the state characterizing module 124. In order to incorporate the performance (e.g., sustainability) metrics, the state machine abstracted at blocks 310-316 may be augmented to a 5-tuple to include a n×p matrix of distributions of p sustainability metrics associated with each of the n states. In addition, the n×p matrix may be computed from the data by mapping all of the points to the states and computing each of the m performance metrics for all the states. Further, the distribution of a performance or sustainability metric in a given state may be estimated using parametric methods such as Gaussian mixture models, or non-parametric methods such as a kernel density estimate.

Following block 320, the state machine abstraction may identify, in a broad sense, which states are good and which states are bad, for instance, which states are efficient and which states are inefficient. In addition, the state machine abstraction may be used to identify the events that led to a transition from a good state to a bad state. An operator may use this information, for instance, to prevent such transitions from occurring again in the future. Similarly, the state machine abstraction may be used to identify the events that led to a transition from a bad state to a good state, and an operator may utilize this information to cause a transition from bad states to good states.

At block 322, a multivariate time series that describes each time point of the collected data with a characterized state may be converted into a univariate symbol stream, for instance, by the time series converting module 126. According to an example, the multivariate time series may be converted through use of the state machine abstraction discussed above. The univariate symbol stream may then be used to mine for patterns in the stream, for instance, whether certain states typically occur prior to other states.

At block 324, the framework for characterization of the entity 142a may be implemented to manage the entity 142a, for instance, by the framework implementing module 128. According to an example, the framework for characterization of the entity 142a may be implemented to control operation of the entity 142a. In this example, for instance, the states in the framework for a characterization of the entity 142a may generally allow a user/operator to reason about the entity 142a in terms of a number of discrete states, which are characterized by performance metrics. Based on the performance metrics, each state may be ranked, and this ranking may be used to compare states, and also determine desirable transitions (to a better ranked state) and, similarly, undesirable transitions. The events (k) causing a transition may be categorized into those within the control of a user (e.g., some parameter setting) and those outside a user's control (e.g., weather conditions). The framework disclosed herein may be used to select user settable parameters such that the entity 142a may likely transition to better ranked states (or at least may be prevented from transitioning to worse ranked states).

According to another example, the framework for characterization of the entity 142a may be implemented to detect anomalies in the operation of the entity 142a. For instance, the framework for characterization of the entity 142a may be used for detecting anomalies that result in degradation of the performance metrics (e.g., sustainability metrics). This may be accomplished by mapping the operational state of the entity 142a to the corresponding state in the abstracted state machine and comparing the current performance metrics (e.g., sustainability metrics) to the performance metrics (e.g., sustainability metrics) distributions for that state. Based on where the current point lies on this distribution, an anomaly alert may be issued. Similarly, for operational data collected over a longer period of time, the current distribution of the performance metrics (e.g., sustainability metrics) may be compared with that of the state, and if the difference is statistically significant, an anomaly alert may be issued. The two distributions may be compared based on a number of techniques such as degree of overlap, Kullback-Leibler divergence, etc.

According to another example, the framework for characterization of the entity 142a may be implemented to assess the entity 142a. For instance, the discussion above with respect to anomaly detection may be used to temporally assess the entity 142a. By way of example, the assessment of the entity 142a may be performed to assess the efficiency of the entity 142a in comparison to the efficiency of the entity 142a under similar conditions in the past. If data is available for two or more similar entities 142a-142b, then the entity 142a may be compared or assessed with its "peer(s)". If the number of such entities 142a-142b is relatively small, then a pair-wise comparison may be performed, where the distributions of the performance metrics (e.g., sustainability metrics) may be compared for the same states for the two entities. If a sufficient number of entities 142a-142n are available, then averaged reference distributions for a particular state for that kind of entity 142a may be established, and distributions of individual entities 142a-142n may be compared against the reference. This technique may be used to quantitatively determine, for instance, where a particular entity lies (e.g., what percentile) in a population of peers in terms of a sustainability metric.

According to a further example, the framework for characterization of the entity 142a may be implemented to predict a future state of the entity 142a. As discussed above, a state in the state machine may capture all of the features used to determine that state. Thus, assuming that the error introduced by a state machine abstraction is acceptable, predicting future states may be equivalent to a multivariate time series prediction for the entity features considered. Any suitable standard machine learning models may be used to predict entity states, including random forests, support vector machines, neural networks, Gaussian process regression, etc. In one regard, because the states may be associated with sustainability metric distributions, knowing future states may provide information on future performance of the entity 142a in terms of the sustainability metrics.

According to a yet further example, the framework for characterization of the entity 142a may be implemented to determine usage patterns of the entity 142a, for instance, through mining of the state-symbol stream. According to an example, item set mining may be used to scalably discover most frequently occurring patterns or motifs. Furthermore, temporal relationships between states may be discovered, for example, state A always occurs before state B, or state A is always followed by state C, etc.

Some or all of the operations set forth in the methods 200 and 300 may be contained as utilities, programs, or subprograms, in any desired computer accessible medium. In addition, the methods 200 and 300 may be embodied by computer programs, which can exist in a variety of forms both active and inactive. For example, they may exist as software program(s) including program instructions in source code, object code, executable code or other formats. Any of the above may be included on a computer readable storage medium.

Example computer readable storage media include conventional computer system RAM, ROM. EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
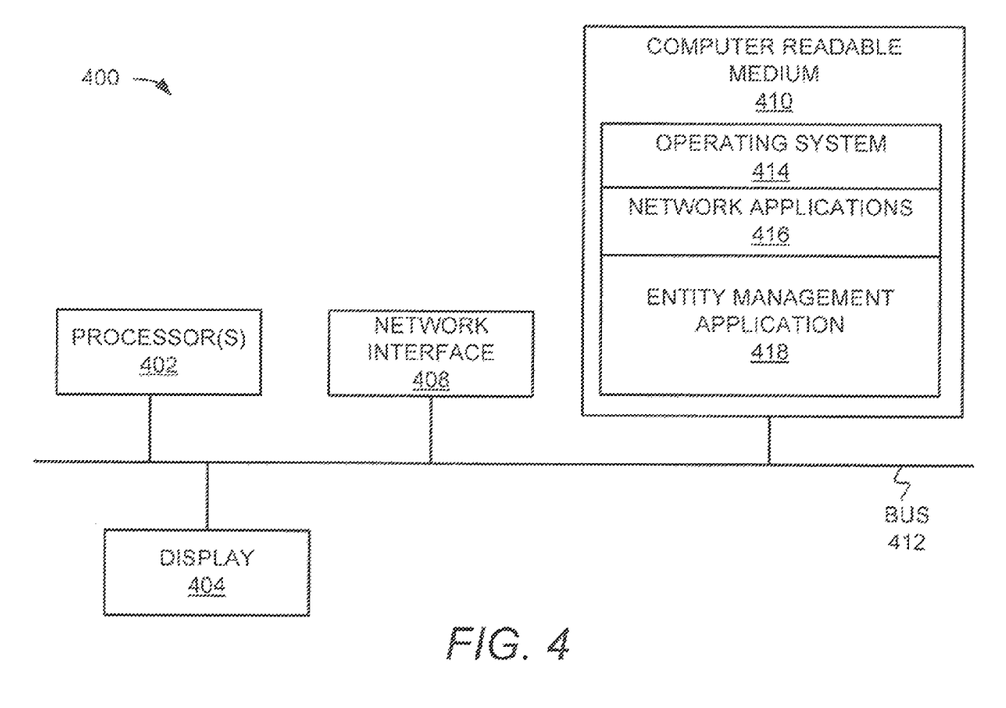
FIG. 4 illustrates a block diagram of a computing device to implement the methods depicted in FIGS. 2, 3A, and 3B, according to an example of the present disclosure.

Turning now to FIG. 4, there is shown a block diagram of a computing device 400 to implement the methods depicted in FIGS. 2, 3A, and 3B, in accordance with an example. The device 400 may include a processor 402, such as a central processing unit; a display device 404, such as a monitor; a network interface 408, such as a Local Area Network LAN, a wireless 802.11x LAN, a 3G mobile WAN or a WiMax WAN; and a computer-readable medium 410. Each of these components may be operatively coupled to a bus 412. For example, the bus 412 may be an EISA, a PCI, a USB, a FireWire, a NuBus, or a PDS.

The computer readable medium 410 may be any suitable non-transitory medium that participates in providing instructions to the processor 402 for execution. For example, the computer readable medium 410 may be non-volatile media, such as an optical or a magnetic disk; volatile media, such as memory; and transmission media, such as coaxial cables, copper wire, and fiber optics.

The computer-readable medium 410 may also store an operating system 414, such as Mac OS, MS Windows, Unix, or Linux; network applications 416; and an entity management application 418. The network applications 416 include various components for establishing and maintaining network connections, such as machine readable instructions for implementing communication protocols including TCP/IP, HTTP, Ethernet, USB, and FireWire.

The entity management application 418 may provide various components for managing an entity, as described above. The entity management application 418 may include the modules 112-128 of the management apparatus 110 discussed above. In certain examples, some or all of the processes performed by the application 418 may be integrated into the operating system 414. In certain examples, the processes may be at least partially implemented in digital electronic circuitry, or in computer hardware, machine readable instructions (including firmware and/or software), or in any combination thereof.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for managing an entity, said method comprising:
    establishing a framework for characterization of the entity by abstracting operation of the entity to a state machine, wherein each state in the state machine is characterized in terms of distributions of a performance metric associated with the entity, and wherein abstracting operation of the entity comprises:
        determining a set of a plurality of states (n) of the entity;
        determining a n×n transition matrix such that an element (i,j) of the transition matrix specifies the probability of the entity transitioning from a state i to a state j;
        determining a set of m symbols that correspond to events that lead to the transitions from state i to state j; and
        determining a n×n×m matrix that specifies events that lead to transitions such that an element (i,j,k) of the n×n×m matrix specifies the probability that event (k) causes a transition from state i to state j; and
    implementing, by a processor, the framework for characterization of the entity to manage the entity.

2. The method according to claim 1, wherein establishing the framework further comprises:
    collecting data related to the entity from a source;
    preprocessing the collected data to merge the collected data; and
    transforming the preprocessed data.

3. The method according to claim 2, further comprising:
    constructing a causal model for the entity that relates at least one of a resource use and a performance metric to at least one of utilization, performance, and environmental conditions of the entity.

4. The method according to claim 2, wherein abstracting operation of the entity to the state machine further comprises abstracting operation of the entity to the state machine using the transformed data.

5. The method according to claim 1, wherein determining the n×n transition matrix further comprises determining the n×n transition matrix by mapping collected data points to the states and computing the probability of the transitions.

6. The method according to claim 1, further comprising:
    characterizing each of the states of the entity in terms of a performance metric; and
    incorporating the characterized states into the state machine abstraction.

7. The method according to claim 6, said method further comprising:
    converting a multivariate time series that describes each time point of the collected data with a characterized state into a univariate symbol stream.

8. The method according to claim 7, wherein implementing the framework to analyze the entity further comprises implementing the framework to at least one of detect an anomaly that results in a degradation of the performance metric, assess an efficiency of the entity, predict a future state of the entity, and determine usage patterns of the entity.

9. An apparatus for managing an entity, said apparatus comprising:
a processor;
a memory storing at least one module comprising machine readable instructions that are to cause the processor to:
establish an abstraction of a state machine, wherein each state in the state machine is characterized in terms of distributions of a performance metric associated with the entity, wherein to establish the abstraction of the state machine, the machine readable instructions are further to cause the processor to:
determine a transition matrix such that an element of the transition matrix specifies the probability of the entity transitioning from a first state to a second state;
determine a set of symbols that correspond to events that lead to the transitions from the first state to the second state; and
determine a matrix that specifies events that lead to transitions such that an element of the determined matrix specifies the probability that an identified event causes a transition from the first state to the second state; and
implement the abstracted state machine to manage the entity.

10. The apparatus according to claim 9, wherein machine readable instructions are further to:
collect data related to the entity from a source;
preprocess the collected data to merge the collected data; and
transform the preprocessed data.

11. The apparatus according to claim 9, wherein the machine readable instructions are further to:
characterize each of the states of the entity in terms of a performance metric; and
incorporate the characterized states into the state machine abstraction.

12. The apparatus according to claim 11, wherein the machine readable instructions are further to:
convert a multivariate time series that describes each time point of the collected data with a characterized state into a univariate symbol stream using the abstraction of the state machine.

13. The apparatus according to claim 9, wherein the machine readable instructions are further to:
implement the framework to at least one of detect an anomaly that results in a degradation of the performance metric, assess an efficiency of the entity, predict a future state of the entity, and determine usage patterns of the entity.

14. A non-transitory computer readable storage medium on which is stored machine readable instructions that when executed by a processor, implements a method to manage an entity, wherein said machine readable instructions are to cause the processor to:
establish an abstraction of a state machine, wherein each state in the state machine is characterized in terms of distributions of a performance metric associated with the entity, wherein to establish the abstraction of the state machine, the machine readable instructions are further to cause the processor to:
determine a transition matrix such that an element of the transition matrix specifies the probability of the entity transitioning from a first state to a second state;
determine a set of symbols that correspond to events that lead to the transitions from the first state to the second state; and
determine a matrix that specifies events that lead to transitions such that an element of the determined matrix specifies the probability that an identified event causes a transition from the first state to the second state;
characterize each of the states of the entity in terms of a performance metric;
incorporate the characterized states into the state machine abstraction; and
implement the abstracted state machine with the incorporated characterized states to manage the entity.

15. The non-transitory computer readable storage medium according to claim 14, wherein to determine the transition matrix, the machine readable instructions are further to cause the processor to determine the transition matrix by mapping collected data points to the states and computing the probability of the transitions.

* * * * *